(12) United States Patent
Pritchard et al.

(10) Patent No.: US 9,694,678 B2
(45) Date of Patent: Jul. 4, 2017

(54) ALL-WHEEL DRIVE DISCONNECT WITH INDEPENDENT DRIVE

(71) Applicant: BorgWarner Inc., Auburn Hills, MI (US)

(72) Inventors: Larry A. Pritchard, Macomb, MI (US); Thad Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/693,983

(22) Filed: Apr. 23, 2015

(65) Prior Publication Data

US 2015/0321552 A1 Nov. 12, 2015

Related U.S. Application Data

(60) Provisional application No. 61/989,263, filed on May 6, 2014.

(51) Int. Cl.

| | |
|---|---|
| *F16D 48/06* | (2006.01) |
| *B60K 17/28* | (2006.01) |
| *B60K 23/08* | (2006.01) |
| *F16H 57/04* | (2010.01) |
| *F16H 48/19* | (2012.01) |
| *B60K 17/35* | (2006.01) |

(52) U.S. Cl.
CPC ............. *B60K 23/08* (2013.01); *B60K 17/35* (2013.01); *F16H 48/19* (2013.01); *F16H 57/0483* (2013.01); *B60K 2023/0833* (2013.01); *B60K 2023/0866* (2013.01); *Y10T 29/49465* (2015.01)

(58) Field of Classification Search
CPC  B60K 23/08; B60K 17/35; B60K 2023/0833; B60K 2023/0858; B60K 2023/0866; F16D 48/062; F16H 48/19; F16H 2048/366; Y10T 29/49465
See application file for complete search history.

(56) References Cited

U.S. PATENT DOCUMENTS

| | | | |
|---|---|---|---|
| 6,578,654 B2 * | 6/2003 | Porter ................ | B60K 23/0808 180/249 |
| 2012/0024614 A1 * | 2/2012 | Sigmund ............ | B60K 23/0808 180/248 |

* cited by examiner

*Primary Examiner* — Justin Holmes
*Assistant Examiner* — Lillian Nguyen
(74) *Attorney, Agent, or Firm* — Young Basile Hanlon & MacFarlane, P.C.

(57) ABSTRACT

A disconnect mechanism for a secondary driveline and method of assembly can be used in an all-wheel drive (AWD) vehicle having a rear driveline module (RDM) for changing drive modes between a two-wheel drive mode and an AWD mode. The disconnect mechanism can include a hydraulically actuated coupling clutch connected to a power take-off unit (PTU) for transferring rotary power from the PTU to the RDM during the AWD mode, a hydraulically actuated first and second rear clutch for rotationally connecting and disconnecting corresponding first and second rear axles drivingly coupled to rear wheels during the AWD mode and two-wheel drive mode, respectively, and a hydraulic actuating assembly including a source of pressurized fluid for actuating the coupling clutch, the first rear clutch, and the second rear clutch, and for synchronizing any speed differential therebetween.

14 Claims, 3 Drawing Sheets

ALL-WHEEL DRIVE DISCONNECT WITH INDEPENDENT DRIVE

CROSS-REFERENCE TO RELATED APPLICATIONS

This application claims the benefit of U.S. Patent Application No. 61/989,263, filed on May 6, 2014, the disclosure of which is herein incorporated by reference in its entirety.

FIELD OF THE INVENTION

The invention relates to vehicle drivelines and, more particularly, to a hydraulically actuated vehicle driveline having a disconnect for changing from an all-wheel drive mode to a two wheel drive mode.

BACKGROUND

Current use of rear driveline modules (RDMs) in an all-wheel drive (AWD) vehicle can allow operation of the vehicle in an AWD mode. Current AWD vehicles can include a primary driveline, a secondary driveline, and a disconnectable power take-off unit (PTU) allowing operation of the vehicle between a two-wheel drive mode and the AWD mode. The RDM can include a geared differential for transmitting rotary power between one or more rear drive wheels which can be economically inefficient. In an effort to minimize energy loss and provide a more fuel efficient driveline in an AWD vehicle during the two-wheel drive mode, it can be desirable to disconnect the RDM. Current disconnect systems can include a dog clutch located at the PTU and a rear driveline coupling clutch mounted on the rear drive axle for synchronization of the driveline prior to reconnection of the RDM. The current configuration results in blocked shifts in the PTU when the dog clutch is engaged and also requires packaging an actuator in the vicinity of the PTU to engage the dog clutch. It can be desirable for the coupling to synchronize the driveline in a timely fashion. Disconnect mechanisms for AWD vehicles have been previously disclosed in U.S. Pat. No. 8,469,854; U.S. Pat. No. 6,105,703; U.S. Pat. No. 5,105,421; U.S. Patent Application No. 2012/0024614; U.S. Patent Application No. 2011/0275470; and U.S. Patent Application No. 2011/0256976.

SUMMARY

All-wheel drive (AWD) vehicles can include a primary driveline, a secondary driveline, and a power take-off unit (PTU). The primary driveline can include a front driveline module for driving a pair of front wheels and the secondary driveline can include a rear driveline module (RDM) for driving a pair of rear wheels through a split rear driveshaft with first and second coaxial rear axles. The RDM and PTU can have hydraulically actuated clutches for connecting the secondary driveline during an AWD mode. It can be desirable to provide a hydraulically actuated clutch rather than a dog clutch at the PTU to eliminate block shifts from occurring. A hydraulic actuator for actuating the clutches can be mounted on the RDM with a fixed or flexible tube connection to the clutch actuator in the PTU resulting in considerable packaging flexibility. The clutch at the PTU and rear clutches in the RDM can be used to synchronize the speed differential of the stationary components for speeding up synchronization time. The system can also use one powered pump or motor to accomplish coupling actuation and on-demand lubrication. A clutch can be used for each rear axle in the RDM enabling the removal of a geared differential from the RDM in order to minimize cost.

A disconnect mechanism for a secondary driveline can be used in an AWD vehicle. The AWD vehicle can include a front driveline module and a RDM having a split rear driveshaft with first and second coaxial rear axles. Each rear axle can be drivingly coupled to a corresponding rear wheel such that the disconnect mechanism can change drive modes between a two-wheel drive mode and an AWD mode. The disconnect mechanism can include a hydraulically actuated coupling clutch connected to a PTU for transferring rotary power from the PTU to the RDM during the AWD mode, a hydraulically actuated first rear clutch and a hydraulically actuated second rear clutch, and a hydraulic actuating assembly. The first and second rear clutch can be located coaxial with respect to one another in the RDM for transferring rotary power to a corresponding one of the first and second rear axles and can rotationally disconnect the corresponding one of the first and second rear axles during the two-wheel drive mode. The first and second rear clutch can be hydraulically actuated for rotationally connecting the corresponding one of the first and second rear axles during the AWD mode. The hydraulic actuating assembly can include a source of pressurized fluid for actuating the coupling clutch, the first rear clutch, and the second rear clutch, and for synchronizing any speed differential therebetween.

The disconnect mechanism for a secondary driveline of an AWD vehicle can include a rear driveline module having a split rear driveshaft having first and second coaxial rear axles such that each rear axle can be connected to a corresponding rear wheel. The disconnect mechanism can also include a hydraulically actuated coupling clutch for the PTU to receive and transfer rotary power from the front driveline module. The coupling clutch can transfer rotary power from the PTU to the RDM during the AWD mode. The disconnect mechanism can further include a first rear clutch and a second rear clutch located coaxial with respect to one another in the RDM for transferring rotary power to a corresponding one of the first and second rear axles. The first rear clutch and the second rear clutch can disconnect the corresponding one of the first and second rear axles during a two-wheel drive mode and connect the corresponding one of the first and second rear axles during the AWD mode. The disconnect mechanism can further include a hydraulic actuating assembly having a hydraulic pump for actuating the coupling clutch, the first rear clutch, and the second rear clutch, and supplying on-demand lubrication to the RDM.

A method of assembling a disconnect mechanism for a secondary driveline in an AWD vehicle having a front driveline module and RDM is disclosed. The secondary driveline can include a RDM having a split rear driveshaft with first and second coaxial rear axles. Each of the first and second rear axles can be connected to a corresponding rear wheel and the disconnect mechanism can be operable for changing between a two-wheel drive mode and an AWD mode. The method can include connecting a hydraulically actuated coupling clutch for a PTU for transferring rotary power from the PTU to the RDM during the AWD mode and positioning a first hydraulically actuated rear clutch and a second hydraulically actuated rear clutch coaxially with respect to one another for transferring rotary power to a corresponding one of the first and second rear axles from the PTU. The first rear clutch and the second rear clutch can disconnect the first and second rear axles from the PTU during the two-wheel drive mode and connect the first and second rear axles to the PTU during the AWD mode. The method can further include fluidly connecting a hydraulic actuating assembly having a source of pressurized fluid and a plurality of hydraulic actuators for actuating the first rear clutch, the second rear clutch, and the coupling clutch, and for supplying on-demand lubrication of the RDM.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
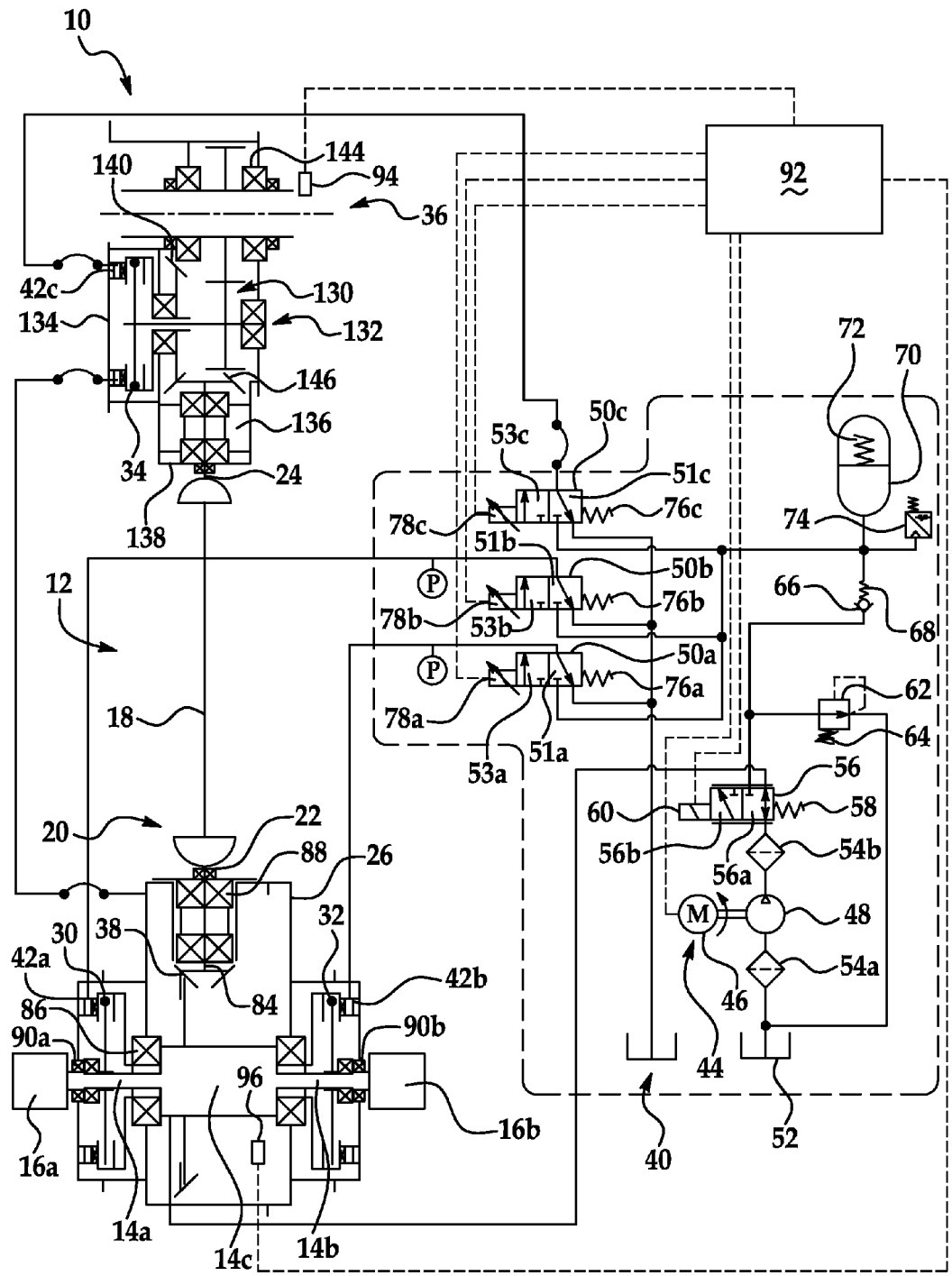
FIG. 1 is a schematic view of a disconnect system for a secondary driveline illustrating a hydraulically actuated coupling clutch connected to a power take-off unit (PTU) for transferring power from the PTU to a rear driveline module (RDM) during an all-wheel drive (AWD) mode, a hydraulically actuated first and second rear clutch for rotationally connecting and disconnecting a corresponding first and second rear axle during the AWD mode and a two-wheel drive mode, respectively, and a hydraulic actuating assembly for actuating the coupling clutch, the first and second rear clutch, and for synchronizing any speed differential therebetween.

An all-wheel drive (AWD) motor vehicle can include a powertrain for transferring rotary power from a primary source of power, such as an internal combustion engine or a powered motor. The powertrain can include any type of ratio-changing mechanism, such as a manual, automatic, or continuously variable transmission. The powertrain can transfer the rotary power to a front driveline module or a rear driveline module (RDM) 20. The transmission can split rotary power between a primary driveline and a power take-off unit (PTU) 36, which can transfer rotary power to a secondary driveline 12 for engaging the RDM 20. The RDM 20 can include a split rear driveshaft with first and second coaxial rear axles 14a, 14b. Each rear axle 14a, 14b can be drivingly coupled to a corresponding rear wheel 16a, 16b. A disconnect mechanism 10 can be provided for the secondary driveline 12 for changing drive modes between a two-wheel drive mode, where the rear wheels 16a, 16b can be operably disconnected, and an AWD mode, where the rear wheels 16a, 16b are operably connected.

Referring now to FIG. 1, an improvement of the disconnect mechanism 10 is shown to include a hydraulically actuated coupling clutch 34 connected to the PTU 36, a hydraulically actuated first rear clutch 30, a hydraulically actuated second rear clutch 32, and a hydraulic actuating assembly 40. The hydraulic actuating assembly 40 can actuate the coupling clutch 34 for transferring rotary power from the PTU 36 to the RDM 20 during the AWD mode. The first and second rear clutches 30, 32 can be located coaxial with respect to one another in the RDM and can transfer rotary power to a corresponding one of the first and second rear axles 14a, 14b. The first and second rear clutch 30, 32 can rotationally disconnect the corresponding pair of rear axles 14a, 14b during the two-wheel drive mode and rotationally connect the corresponding pair of rear axles 14a, 14b during the AWD mode. The hydraulic actuating assembly 40 can include a source of pressurized fluid 44 for actuating the coupling clutch 34, the first rear clutch 30, and the second rear clutch 32, and for synchronizing any speed differential therebetween.

As illustrated in FIG. 1, the hydraulic actuating assembly 40 can include a fluid source or sump 52 operable to receive and contain a volume of hydraulic fluid. The source of pressurized fluid 44 can be in fluid communication with the fluid source 52 for pressurizing the fluid from the fluid source 52 and variably supplying the pressurized fluid to the disconnect mechanism 10. The hydraulic actuating assembly 40 can include an on-demand lubrication system supplied by the source of pressurized fluid 44 for lubricating the RDM 20. The hydraulic fluid can include oil suitable for use in a motor vehicle and the source of pressurized fluid 44 can include a powered motor 46 and a hydraulic pump 48. The source of pressurized fluid 44 is not limited to any particular hydraulic fluid pressure generating device and can include without limitation a pump, valves, hydraulic accumulator, and electronic control unit, or any combination thereof. The hydraulic actuating assembly 40 can include at least one filter 54a, 54b operable for removing contaminants from the fluid. The at least one filter 54a can be operable between the fluid source 52 and the source of pressurized fluid 44. The at least one filter 54b can be operable between the source of pressurized fluid 44 and a lubrication control valve 56. A lubrication biasing spring 58 can normally bias the lubrication control valve 56 in a first position 56a allowing for fluid communication between the source of pressurized fluid from the fluid source 52 through the lubrication control valve 56 to the RDM 20 while allowing fluid communication to return pressurized fluid from the RDM 20 to the fluid source 52. The lubrication control valve 56 can provide lubrication to the RDM 20 when in the first position 56a. The lubrication control valve 56 can include a solenoid 60 and a two-port valve operable for switching between the first position 56a and a second position 56b. The solenoid 60 can overcome the spring force of the lubrication biasing spring 58 to switch the lubrication control valve 56 to the second position 56b allowing fluid communication through the lubrication control valve 56 to an accumulator 70 and a plurality of control valves 50a, 50b, 50c. The hydraulic actuating assembly 40 can further include a pressure control mechanism 62 in fluid communication between the accumulator 70 and the fluid source 52. The pressure control mechanism 62 can include a pressure valve spring 64 for normally biasing the pressure control mechanism 62 in a closed position. The pressure control mechanism 62 can operate in response to fluid pressure communicating with the accumulator 70 to open and return pressurized fluid to the fluid source or sump 52 if fluid pressure is greater than the spring force of the pressure valve spring 64.

In operation, the lubrication control valve 56 can be moved to the second position 56*b* allowing fluid communication with the accumulator 70 and clutch actuation control valves 50*a*, 50*b*, 50*c* after sufficient pressurization of the hydraulic fluid by the source of pressurized fluid 44 to overcome force of a biasing spring 68 of check valve 66. The check valve 66 can include a biasing spring 68, such that the pressurized fluid can overcome the spring force of the biasing spring 68 to pass through the check valve 66 toward the accumulator 70. The check valve 66 can provide for fluid flow toward the accumulator 70 and the plurality of control valves 50*a*, 50*b*, 50*c* and can prevent backflow of fluid toward the source of pressurized fluid 44. After passage through the check valve 66, the pressurized fluid can flow to the plurality of control valves 50*a*, 50*b*, 50*c* and the hydraulic accumulator 70. The accumulator 70 can act as a pressurized fluid reservoir for holding a volume of the fluid under pressure and for maintaining the fluid pressure and volume in the hydraulic actuation assembly 40. The hydraulic accumulator 70 can include an accumulator spring 72 for maintaining pressure on the fluid and a pressure relief valve 74 can be provided for selectively controlling a discharge of excessive fluid pressure from the hydraulic accumulator 70. The pressurized fluid can flow from the hydraulic accumulator 70 or can pass through the check valve 66 to flow toward the plurality of control valves 50*a*, 50*b*, 50*c*. The first control valve 50*a* can be in fluid communication with the second rear clutch 32. The second control valve 50*b* can be in fluid communication with the first rear clutch 30. The third control valve 50*c* can in fluid communication with the coupling clutch 34. Each control valve 50*a*, 50*b*, 50*c* can have a corresponding biasing spring 76*a*, 76*b*, 76*c* for normally biasing the control valve 50*a*, 50*b*, 50*c* toward a first position 51*a*, 51*b*, 51*c* and a corresponding solenoid 78*a*, 78*b*, 78*c* for switching the control valve 50*a*, 50*b*, 50*c* from the first position 51*a*, 51*b*, 51*c* toward a second position 53*a*, 53*b*, 53*c*. The first position 51*a*, 51*b*, 51*c* of each control valve 50*a*, 50*b*, 50*c* can be a closed position preventing fluid communication between the source of pressurized fluid 44 or accumulator 70 and the corresponding clutch 30, 32, 34. In the first position 51*a*, 51*b*, 51*c*, the control valve 50*a*, 50*b*, 50*c* allows fluid communication between the corresponding clutches 30, 32, 34 and the fluid source 52 to discharge pressurized fluid from one of the corresponding clutch actuators 42*a*, 42*b*, 42*c*, allowing the corresponding clutch 30, 32, 34 to return to a first position. The second position 53*a*, 53*b*, 53*c* of each control valve 50*a*, 50*b*, 50*c* can be an open position allowing fluid communication between the source of pressurized fluid 44 or the accumulator 70 and a corresponding one of the plurality of hydraulic actuators 42*a*, 42*b*, 42*c* of the corresponding clutches 30, 32, 34 driving the corresponding clutch 30, 32, 34 to a second position, while preventing fluid communication with the fluid source or sump 52.

The pressurized fluid can flow through the plurality of control valves 50*a*, 50*b*, 50*c* towards the plurality of hydraulic actuators 42*a*, 42*b*, 42*c* in fluid communication with one of the corresponding first rear clutch 30, second rear clutch 32, and coupling clutch 34. The RDM 20 can include a first hydraulic actuator 42*a* and a second hydraulic actuator 42*b* for operating the first rear clutch 30 and the second rear clutch 32, respectively, between first and second positions. The PTU 36 can include a hydraulic actuator 42*c*. Depending on the desired configuration, the clutches 30, 32, 34 can be either a normally engaged configuration or a normally disengaged clutch configuration. In either case, fluid communication with the source of pressurized fluid 44 or accumulator 70 drives the particular clutch 30, 32, 34 from a normal spring biased position to a hydraulically actuated position. By way of example and not limitation, a fixed or flexible hose assembly can connect the hydraulic actuator 42*c* for the coupling clutch 34 to a control valve 50*c* located on the RDM. The fixed or flexible hose assembly can provide for packaging flexibility of the disconnect mechanism 10. By way of example and not limitation, the plurality of hydraulic actuators 42*a*, 42*b*, 42*c* can transfer pressurized fluid to load or actuate the first rear clutch 30, the second rear clutch 32, and the coupling clutch 34 to switch from two-wheel drive mode to AWD mode. Each of the first rear clutch 30, the second rear clutch 32, and the coupling clutch 34 can include a friction clutch pack 80 having sets of alternating friction plates as is conventional and recognized by those skilled in the art. During engagement of the first rear clutch 30, the second rear clutch 32, and the coupling clutch 34, pressurized fluid can load and compress the friction plates within the corresponding friction clutch pack 80 of each clutch to actuate the first rear clutch 30, the second rear clutch 32, and the coupling clutch 34. The same pressurized fluid can also be used to provide on-demand lubrication of components within the RDM 20 during engagement of the RDM 20 in either the AWD mode or the two-wheel drive mode.

As illustrated in FIG. 1, the hydraulic actuator 42*c* can actuate the coupling clutch 34 for engagement of the PTU 36. The PTU 36 can include an input shaft operable to receive rotary power from a front driveline module and an output pinion shaft 24 connected with an input pinion shaft 22 through a driveshaft 18. The hydraulic actuating assembly 40 can actuate the coupling clutch 34 for transmitting rotary power between a primary driveline shaft 144 and the output pinion shaft 24. In operation, the motor vehicle can be operated in a two-wheel drive mode or front-wheel drive mode in which the PTU 36 and the RDM 20 are disengaged. In the two-wheel drive mode, the powertrain can transfer rotary power to the front driveline module. In the two-wheel drive mode, the output pinion shaft 24, the driveshaft 18, the input pinion shaft 22, and intermediate rear driveshaft 14*c* are not back-driven due to rolling movement of the pair of rear wheels 16*a*, 16*b*. The PTU 36 can include a case 132 enclosing a pinion gear 130 driven by a corresponding gear attached to the primary driveline shaft 144. The pinion gear 130 is connected to drive the input plates of the coupling clutch 34. The output plates of the coupling clutch 34 are connected to drive a ring gear 140. The ring gear 140 intermeshes to drive an output pinion gear 146 connected to the output pinion shaft 24. The output pinion shaft 24 can connect through the driveshaft 18 to drive the input pinion shaft 22 as an input for the RDM 20. A housing 134 can receive the coupling clutch 34 and the pinion gear 130. The output plates of the coupling clutch 34 can drive the ring gear 140 for transferring rotary power from the front driveline module to the secondary driveline. When the coupling clutch 34 is disengaged, the input clutch plates can be uncoupled from the output clutch plates to disengage the primary driveline shaft 144 from the secondary driveline, preventing the transfer of rotary power from the front driveline module.

Figure 2:
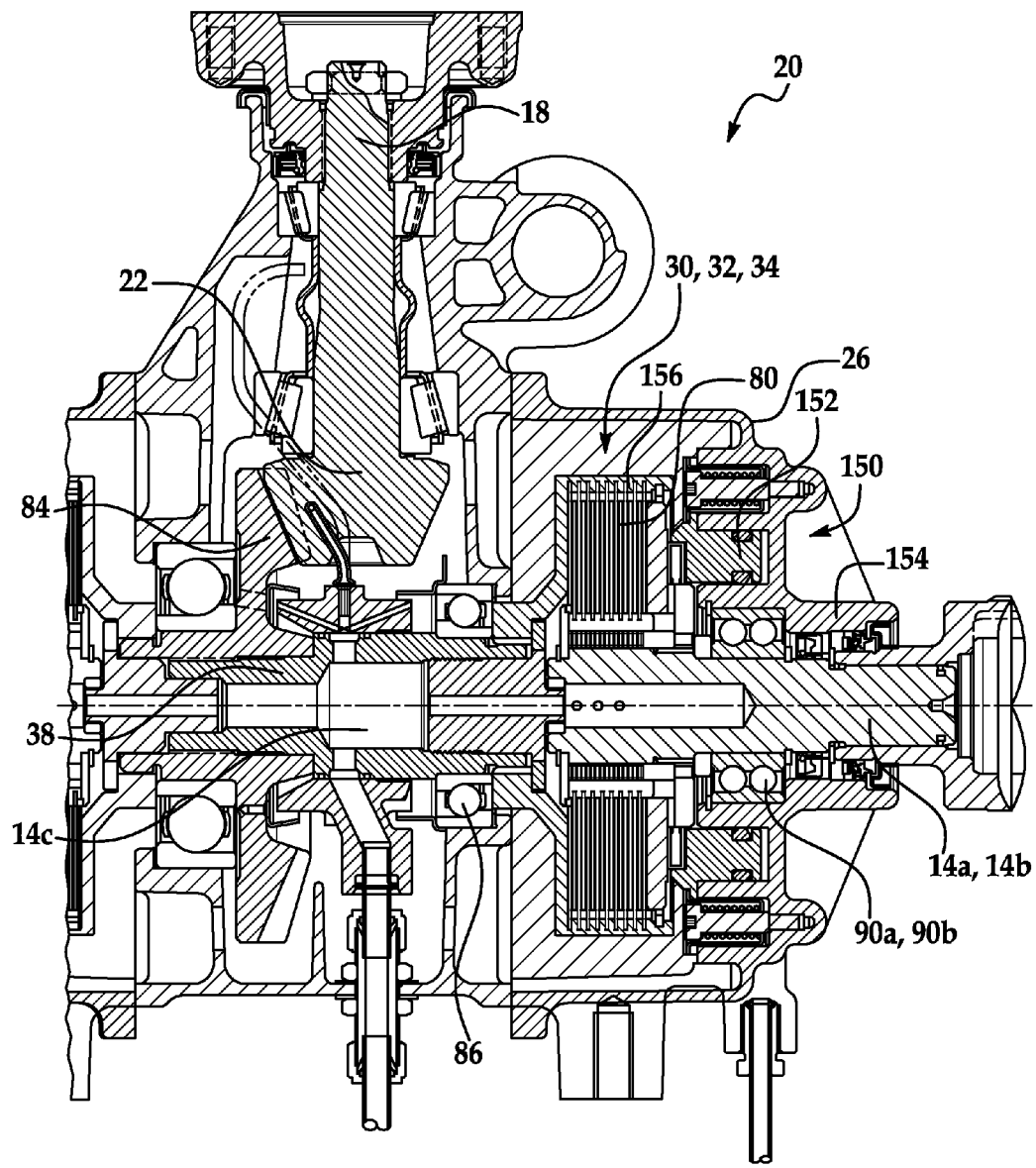
FIG. 2 is a cross sectional view of the RDM illustrating a connection of an output shaft from the PTU for transferring power through a pinion and ring gear assembly to an intermediate rear driveshaft interposed between the rear clutches, where the hydraulic actuating assembly includes a clutch apply piston assembly having a stationary apply piston supported for reciprocation within a fluid chamber formed in a stationary clutch housing for applying axial pressure to actuate the clutch.

As illustrated in FIGS. 1-2, the plurality of hydraulic actuators 42*a*, 42*b* can actuate the first rear clutch 30 and the second rear clutch 32 for engagement of the RDM 20 during the AWD mode. The RDM 20 can include a rear case 26, the first rear clutch 30, and the second rear clutch 32. The first rear clutch 30 can drive one of the pair of rear axles 14a during engagement and the second rear clutch 32 can drive the other of the pair of rear axles 14b during engagement. The first rear clutch 30 and the second rear clutch 32 can couple the rear axles 14a, 14b to an intermediate shaft 14c. The intermediate shaft 14c can be located interposed between the first rear clutch 30 and the second rear clutch 32. The intermediate shaft 14c is located coaxial with respect to the first and second rear axles 14a, 14b and is connected to the first and second rear axles 14a, 14b by the first and second rear clutches 30, 32. The intermediate shaft 14c can be disconnected from the first and second rear axles 14a, 14b by the first and second clutches 30, 32 during the two-wheel drive mode. The rear axles 14a, 14b can rotate in unison with the respective rear wheels 16a, 16b. A plurality of bearings 90a, 90b can support the rotation of the rear axles 14a, 14b. The RDM 20 can include an input pinion gear 84 connected to an input shaft 22 driven by an output of the PTU 36 through driveshaft 18. The driveshaft 18 can drive the input shaft 22, which can be coupled to the input pinion gear 84. A plurality of ring gear support bearings 86 can support a ring gear 38 connected to the intermediate shaft 14c and provide for rotational movement of the ring gear 38 driven by the input pinion gear 84. The ring gear 38 can rotate in unison with the intermediate shaft 14c. The input pinion gear 84 and ring gear 38 can include bevel gear teeth to accommodate the rotational axis of the intermediate shaft 14c. By way of example and not limitation, the RDM 20 can include a plurality of return passages for pressurized fluid to flow back to the fluid source 52. At least one of the return passages can be connected between the PTU 36 and the RDM 20.

As illustrated in FIG. 2, at least one of the coupling clutch 34, the first rear clutch 30, and the second rear clutch 32 can include a clutch apply piston assembly 150 for applying axial pressure against the corresponding clutch pack 80 from the source of pressurized fluid 44. The clutch pack 80 can be received in a clutch housing 156. As illustrated in FIG. 2, the piston assembly 150 can include a stationary apply piston 152 supported for reciprocation within a fluid chamber formed in a stationary portion 154 of the clutch housing 156.

Figure 3A:
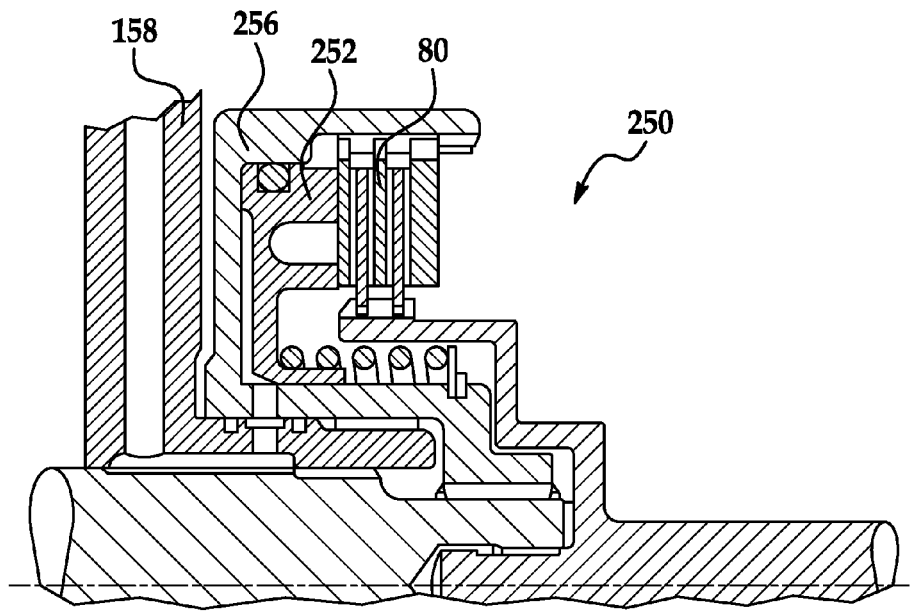
FIG. 3A is a detailed cross sectional view of a clutch apply piston assembly having a rotating apply piston supported for reciprocation within the fluid chamber formed in the clutch housing, where the clutch housing is supported for rotation with respect to a stationary reaction shaft.
Figure 3B:
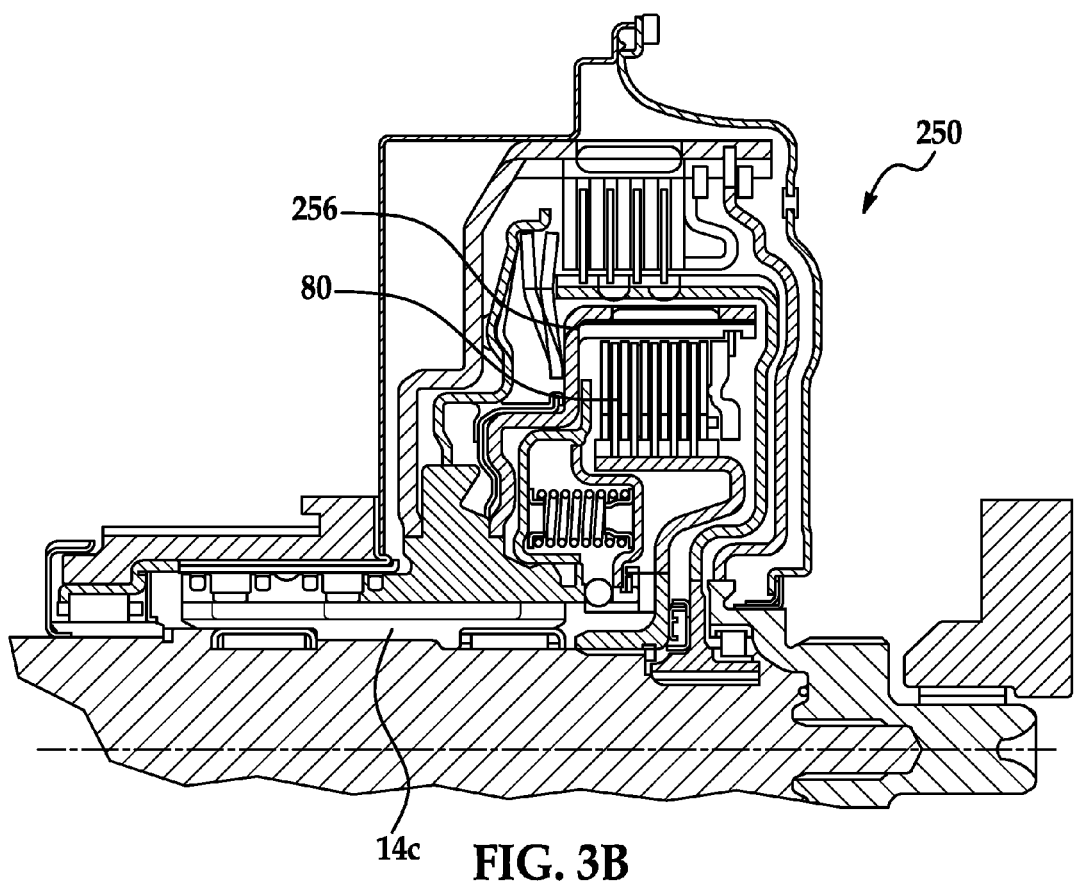
FIG. 3B is a detailed cross sectional view of a clutch apply piston assembly having a rotating apply piston supported for reciprocation within the fluid chamber formed in the clutch housing, where the clutch housing is supported for rotation with an intermediate rear driveshaft interposed between the first rear clutch and second rear clutch.

As illustrated in FIGS. 3A-3B, at least one of the coupling clutch 34, the first rear clutch 30, and the second rear clutch 32 can include a clutch apply piston assembly 250 for applying axial pressure against the corresponding clutch pack 80 from the source of pressurized fluid 44. The clutch pack 80 can be received in a clutch housing 256. The clutch apply piston assembly 250 can include a rotating apply piston 252 and the clutch housing 256 such that the rotating apply piston 252 can be supported for reciprocation within a fluid chamber formed in the clutch housing 256. As illustrated in FIG. 3A, the clutch housing 256 can be fixed to a stationary reaction shaft 158. As illustrated in FIG. 3B, the clutch housing 256 can be fixed to the intermediate shaft 14c for rotation with the ring gear 38. It can be desirable to use the rotating apply piston 252 for reducing the number of components required for clutch actuation, decreasing assembly time, and reducing cost.

In operation, when a driver desires to operate the vehicle in the AWD mode, the disconnect mechanism 10 can include a control unit 92, as illustrated in FIG. 1, for generating signals to actuate the solenoid lubrication control valve 56 to switch from the first position 56a supplying lubrication to the RDM 20 to the second position 56b for actuating at least one of the first rear clutch 30, the second rear clutch 32, and the coupling clutch 34. The control unit 92 can then generate signals to actuate the solenoid control valve 50b for the first rear clutch 30, the solenoid control valve 50a for the second rear clutch 32, and the solenoid control valve 50c for the coupling clutch 34 to switch between the two wheel drive mode and the AWD mode in accordance with a control program stored in memory. The control unit 92 can include a first speed sensor 94 for detecting a rotary speed of the front driveline module and a second speed sensor 96 for detecting a rotary speed of the rear driveline module. The control unit 92 can also determine speed synchronization protocol between the front driveline module and the RDM 20 for controlling the first rear clutch 30, the second rear clutch 32, and the coupling clutch 34 in order to synchronize a rotary speed of the front driveline module with a rotary speed of the RDM 20. The control system can be in communication with a variety of vehicle sensors providing data indicative of parameters including, but not limited to, vehicle speed, four-wheel drive mode, wheel slip, and vehicle acceleration. The control unit 92 can provide signals to the hydraulic actuating assembly 40 for actuation of the first rear clutch 30, the second rear clutch 32, and the coupling clutch 34 to switch the vehicle into the AWD mode. In response to determining speed synchronization, the hydraulic actuating assembly 40 can actuate the coupling clutch 34 such that the powertrain can transmit rotary power between the front driveline module and the RDM 20. When the vehicle is in a two-wheel drive mode, the disconnect mechanism 10 can prevent the pair of rear wheels 16a, 16b from back-driving the secondary driveline by disconnecting intermediate shaft 14c and connected ring gear 38 from the rear axles 14a, 14b with first and second rear clutches 30, 32 disengaged, while the PTU 36 is disengaged through coupling clutch 34. The first rear clutch 30 and the second rear clutch 32 can isolate the intermediate shaft 14c by disconnecting the rear axles 14a, 14b from the intermediate shaft 14c. The rear wheels 16a, 16b can rotate independently based on the tractive conditions of the road.

In operation, the first rear clutch 30 and the second rear clutch 32 can be independently controlled to provide a differential drive function to the RDM 20 when the coupling clutch 34 is engaged. Selective actuation of one of the first rear clutch 30 and the second rear clutch 32 can provide for one of the rear axles 14a, 14b to drive one of the rear wheels 16a, 16b. After engagement of the first rear clutch 30 or the second rear clutch 32, the corresponding friction clutch packs 80 can include input clutch plates connected to the intermediate shaft 14c to engage with output clutch plates connected to the corresponding rear axle 14a, 14b allowing the intermediate shaft 14c and connected rear axle 14a, 14b to rotate together when the particular rear clutch 30, 32 is engaged. The independently controlled first rear clutch 30 and the second rear clutch 32 configuration removes the need for a differential gear assembly interposed between the pair of rear wheels 16a, 16b in the RDM 20 as is known in the art. The removal of a differential gear assembly provides an economic advantage over the RDMs currently used by reducing the number of components required.

A method of assembly for a disconnect mechanism 10 for a secondary driveline 12 can be used in an AWD vehicle having a front driveline module and RDM 20. The secondary driveline 12 can include the RDM 20 which can have a split rear driveshaft having first and second coaxial rear axles 14a, 14b. Each of the first and second rear axles 14a, 14b can be connected to a corresponding rear wheel 16a, 16b and the disconnect mechanism 10 can be operable for changing between a two-wheel drive mode and an AWD mode. The method can include connecting a hydraulically actuated coupling clutch 34 for a PTU 36 for transferring rotary power from the PTU 36 to the RDM 20 during the AWD mode and positioning a first hydraulically actuated rear clutch 30 and a second hydraulically actuated rear clutch 32 coaxially with respect to one another for transferring rotary power to a corresponding one of the first and second rear axles 14*a*, 14*b* from an intermediate rear driveshaft driven by the PTU 36. The first rear clutch 30 and the second rear clutch 32 can disconnect the first and second rear axles 14*a*, 14*b* from the intermediate driveshaft 14*c* connected to PTU 36 during the two-wheel drive mode and connect the first and second rear axles 14*a*, 14*b* to intermediate driveshaft 14*c* connected to the PTU 36 during the AWD mode. The method can further include fluidly connecting a hydraulic actuating assembly 40 having a source of pressurized fluid 44 and a plurality of hydraulic actuators 42*a*, 42*b*, 42*c* for actuating the first rear clutch 30, the second rear clutch 32, and the coupling clutch 34, and for supplying on-demand lubrication of the RDM 20.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An improved disconnect mechanism (10) for a secondary driveline (12) of an all-wheel drive vehicle having a front driveline module and a rear driveline module (20), the secondary driveline (12) including the rear driveline module (20), the rear driveline module (20) including a split rear driveshaft with first and second coaxial rear axles (14*a*, 14*b*), each rear axle (14*a*, 14*b*) drivingly coupled to a corresponding rear wheel (16*a*, 16*b*), the disconnect mechanism (10) for changing drive modes between a two-wheel drive mode and an all-wheel drive mode, the improvement comprising:
   a hydraulically actuated coupling clutch (34) connected to a power take-off unit for transferring rotary power from the power take-off unit (36) to the rear driveline module (20) during the all-wheel drive mode;
   a hydraulically actuated first rear clutch (30) and a hydraulically actuated second rear clutch (32) located coaxial with respect to one another in the rear driveline module (20) for transferring rotary power to a corresponding one of the first and second rear axles (14*a*, 14*b*), the first rear clutch (30) and the second rear clutch (32) rotationally disconnecting the corresponding one of the first and second rear axles (14*a*, 14*b*) during the two-wheel drive mode and hydraulically actuatable for rotationally connecting the corresponding one of the first and second rear axles (14*a*, 14*b*) during the all-wheel drive mode;
   a hydraulic actuating assembly (40) including a source of pressurized fluid (44) having a first independent solenoid control valve (50*a*) for actuating the coupling clutch (34), a second independent solenoid control valve (50*b*) for actuating the first rear clutch (30), and a third independent solenoid control valve (50*c*) for actuating the second rear clutch (32) and for synchronizing any speed differential therebetween; and
   an on-demand lubrication system having a fourth independent solenoid control valve (56) for lubricating the rear driveline module (20) supplied by the source of pressurized fluid (44).

2. The improvement of claim 1, wherein the rear driveline module (20) further comprises:
   an input pinion gear (84) connected to an input shaft (22) through the use of bevel gears and driven by an output of the power take-off unit (36);
   an intermediate shaft (14*c*) located interposed between the first rear clutch (30) and the second rear clutch (32) and coaxial with respect to the first and second rear axles (14*a*, 14*b*) connected by the first and second rear clutches (30, 32) for transferring rotary power from a driveshaft (18) driven by the power take-off unit (36) to the rear wheels (16*a*, 16*b*) during the all-wheel drive mode, the intermediate shaft (14*c*) disconnected from the first and second rear axles (14*a*, 14*b*) by the first and second rear clutches (30, 32) during the two-wheel drive mode; and
   a ring gear (38) connected to the intermediate shaft (14*c*) to be driven by the input pinion gear (84) through a geared connection between the ring gear (38) and the input pinion gear (84).

3. The improvement of claim 2, wherein at least one of the coupling clutch (34), the first rear clutch (30), and the second rear clutch (32) further comprises:
   a clutch piston assembly (150) for applying axial pressure including a stationary apply piston (152) supported for reciprocation within a fluid chamber formed in a stationary clutch housing (156), the clutch housing (156) fixed to a stationary reaction shaft (158).

4. The improvement of claim 2, wherein at least one of the coupling clutch (34), the first rear clutch (30), and the second rear clutch (32) further comprises:
   a clutch apply piston (250) for applying axial pressure including a rotating apply piston (252) and a clutch housing (256), the rotating apply piston (252) supported for reciprocation within a fluid chamber formed in the clutch housing (256), the clutch housing (256) fixed to the intermediate shaft (14*c*) for rotation with the ring gear (38).

5. The improvement of claim 4, wherein the control unit (92) further comprises:
   a first speed sensor (94) for detecting a rotary speed of the front driveline module and a second speed sensor (96) for detecting a rotary speed of the rear driveline module, the control unit (92) for determining speed synchronization protocol between the front driveline module and the rear driveline module (20) for controlling the first rear clutch (30), the second rear clutch (32), and the coupling clutch (34) in order to synchronize a rotary speed of the front driveline module with a rotary speed of the rear driveline module (20).

6. The improvement of claim 1 further comprising:
   a control unit (92) for generating signals to actuate the solenoid control valve (50*b*) for the first rear clutch (30), the solenoid control valve (50*a*) for the second rear clutch (32), and the solenoid control valve (50*c*) for the coupling clutch (34) to switch between the two-wheel drive mode and the all-wheel drive mode in accordance with a control program stored in memory.

7. The improvement of claim 1, wherein the hydraulic actuating assembly (40) further comprises:
   a plurality of hydraulic actuators (42*a*, 42*b*, 42*c*) for actuating the first rear clutch (30), the second rear clutch (32), and the coupling clutch (34); and the first, second, and third solenoid control valves (50a, 50b, 50c) for controlling fluid flow between the source of pressurized fluid (44) and the plurality of hydraulic actuators (42a, 42b, 42c).

8. A disconnect mechanism (10) for a secondary driveline (12) of an all-wheel drive vehicle comprising:
a rear driveline module (20) including a split rear driveshaft having first and second coaxial axles (14a, 14b), each rear axle (14a, 14b) connected to a corresponding rear wheel (16a, 16b);
a hydraulically actuated coupling clutch (34) for a power take-off unit (36) receiving and transferring rotary power from a front driveline module, the coupling clutch (34) for transferring rotary power from the power take-off unit (36) to the rear driveline module (20) during an all-wheel drive mode;
a first rear clutch (30) and a second rear clutch (32) located coaxial with respect to one another in the rear driveline module (20) for transferring rotary power to a corresponding one of the first and second rear axles (14a, 14b), the first rear clutch (30) and the second rear clutch (32) disconnecting the corresponding one of the first and second rear axles (14a, 14b) during a two-wheel drive mode and for connecting the corresponding one of the first and second rear axles (14a, 14b) during the all-wheel drive mode;
a hydraulic actuating assembly (40) including a hydraulic pump (48) having a first independent solenoid control valve (50a) for actuating the coupling clutch (34), a second independent solenoid control valve (50b) for actuating the first rear clutch (30), and a third independent solenoid control valve (50c) for actuating the second rear clutch (32), for synchronizing any speed differential therebetween; and
an on-demand lubrication system having a fourth independent solenoid control valve (56) for lubricating the rear driveline module supplied by the hydraulic pump (48).

9. The disconnect mechanism (10) of claim 8, wherein the rear driveline module (20) further comprises:
an input pinion gear (84) connected to an input shaft (22) driven by an output of the power take-off unit (36);
an intermediate shaft (14c) located interposed between the first rear clutch (30) and the second rear clutch (32) and coaxial with respect to the first and second rear axles (14a, 14b) connected by the first and second rear clutches (30, 32) for transferring rotary power from a driveshaft (18) driven by the power take-off unit (36) to the rear wheels (16a, 16b) during the all-wheel drive mode, the intermediate shaft (14c) disconnected from the first and second rear axles (14a, 14b) by the first and second rear clutches (30, 32) during the two-wheel drive mode; and
a ring gear (38) connected to the intermediate shaft (14c) to be driven by the input pinion gear (84).

10. The disconnect mechanism (10) of claim 9, wherein at least one of the coupling clutch (34), the first rear clutch (30), and the second rear clutch (32) further comprises:
a clutch apply piston assembly (150) for applying axial pressure including a stationary apply piston (152) supported for reciprocation within a fluid chamber formed in a stationary clutch housing (156), the clutch housing (156) fixed to a stationary reaction shaft (158).

11. The disconnect mechanism (10) of claim 9, wherein at least one of the coupling clutch (34), the first rear clutch (30), and the second rear clutch (32) further comprises:
a clutch apply piston assembly (250) for applying axial pressure including a rotating apply piston (252) and a clutch housing (256), the rotating apply piston (252) supported for reciprocation within a fluid chamber formed in the clutch housing (256), the clutch housing (256) fixed to the intermediate shaft (14c) for rotation with the ring gear (38).

12. The disconnect mechanism (10) of claim 8 further comprising:
a control unit (92) for generating signals to actuate the solenoid control valve (50b) for the first rear clutch (30), the solenoid control valve (50a) for the second rear clutch (32), and the solenoid control valve (50c) for the coupling clutch (34) to switch between the two-wheel drive mode and the all-wheel drive mode in accordance with a control program stored in memory.

13. The disconnect mechanism (10) of claim 12, wherein the control unit (92) further comprises:
a first speed sensor (94) for detecting a rotary speed of the front driveline module and a second speed sensor (96) for detecting a rotary speed of the rear driveline module, the control unit (92) for determining speed synchronization protocol between the first driveline module and the rear driveline module (20) for controlling the first rear clutch (30), the second rear clutch (32), and the coupling clutch (34) in order to synchronize a rotary speed of the front driveline module with a rotary speed of the rear driveline module (20).

14. A method of assembly for a disconnect mechanism (10) for a secondary driveline (12) of an all-wheel drive vehicle having a front driveline module and a rear driveline module (20), the secondary driveline (12) including the rear driveline module (20), the rear driveline module (20) including a split rear driveshaft having first and second coaxial rear axles (14a, 14b), each of the first and second rear axles (14a, 14b) connected to a corresponding rear wheel (16a, 16b), the disconnect mechanism (10) for changing between a two-wheel drive mode and an all-wheel drive mode, the method comprising:
connecting a hydraulically actuated coupling clutch (34) for a power take-off unit (36) for transferring rotary power from the power take-off unit (36) to the rear driveline module (20) during the all-wheel drive mode;
positioning a first hydraulically actuated rear clutch (30) and a second hydraulically actuated rear clutch (32) coaxially with respect to one another for transferring rotary power to a corresponding one of the first and second rear axles (14a, 14b) from an intermediate driveshaft (14c) connected to the power take-off unit (36) during the two-wheel drive mode and for connecting the first and second rear axles (14a, 14b) to the intermediate driveshaft (14c) connected to the power take-off unit (36) during the all-wheel drive mode; and
fluidly connecting a hydraulic actuating assembly (40) including a source of pressurized fluid (44) and a plurality of hydraulic actuators (42a, 42b, 42c) for actuating the first rear clutch (30), the second rear clutch (32), and the coupling clutch (34), and providing an independent solenoid control valve (56) for supplying on-demand lubrication of the rear driveline module (20).

* * * * *